(12) United States Patent
Wu et al.

(10) Patent No.: US 11,747,629 B1
(45) Date of Patent: Sep. 5, 2023

(54) DEVICE AND METHOD FOR COMMUNICATION

(71) Applicant: HTC Corporation, Taoyuan (TW)

(72) Inventors: Chun-Yih Wu, Taoyuan (TW);
Ta-Chun Pu, Taoyuan (TW);
Yen-Liang Kuo, Taoyuan (TW)

(73) Assignee: HTC Corporation, Hsinchu (TW)

( * ) Notice: Subject to any disclaimer, the term of this patent is extended or adjusted under 35 U.S.C. 154(b) by 0 days.

(21) Appl. No.: 17/974,343

(22) Filed: Oct. 26, 2022

(51) Int. Cl.
*G02B 27/01* (2006.01)
*G06T 19/00* (2011.01)

(52) U.S. Cl.
CPC ........ *G02B 27/0172* (2013.01); *G06T 19/006* (2013.01); *G02B 2027/0178* (2013.01)

(58) Field of Classification Search
None
See application file for complete search history.

(56) References Cited

U.S. PATENT DOCUMENTS

| 2016/0359596 | A1 | 12/2016 | Wild |
| 2019/0285911 | A1 | 9/2019 | Newman |
| 2022/0187626 | A1* | 6/2022 | Ou-Yang ................ G02C 7/101 |

FOREIGN PATENT DOCUMENTS

CN  108333770 A  7/2018

* cited by examiner

*Primary Examiner* — Nicholas J Lee
(74) *Attorney, Agent, or Firm* — Birch, Stewart, Kolasch & Birch, LLP

(57) ABSTRACT

A communication device includes a frame element, a first wireless transceiver, a reflector, and a contact lens element. The first wireless transceiver is disposed on the frame element. The first wireless transceiver is configured to transmit a wireless signal. The reflector is disposed on the frame element. The reflector is configured to reflect the wireless signal. The contact lens element includes a second wireless transceiver. The second wireless transceiver is configured to receive the wireless signal from the reflector.

20 Claims, 5 Drawing Sheets

DEVICE AND METHOD FOR COMMUNICATION

BACKGROUND OF THE INVENTION

Field of the Invention

The invention relates to a communication device, and more particularly, to a communication device and a communication method.

Description of the Related Art

Antennas are indispensable elements in the field of wireless communication. If an antenna being used for signal reception and transmission has insufficient radiation gain, this may have a negative impact on the overall communication quality. Accordingly, it is an important issue for antenna designers to design a small-size and high-radiation-gain antenna element combined with a relative device.

BRIEF SUMMARY OF THE INVENTION

In a preferred embodiment, the invention proposes a communication device that includes a frame element, a first wireless transceiver, a reflector, and a contact lens element. The first wireless transceiver is disposed on the frame element. The first wireless transceiver is configured to transmit a wireless signal. The reflector is disposed on the frame element. The reflector is configured to reflect the wireless signal. The contact lens element includes a second wireless transceiver. The second wireless transceiver is configured to receive the wireless signal from the reflector.

In some embodiments, the frame element is an XR (Extended Reality) glasses frame.

In some embodiments, the reflector is implemented with a nose pad arm of the XR glasses frame.

In some embodiments, the first wireless transceiver further receives an external signal.

In some embodiments, the first wireless transceiver further generates the wireless signal according to the external signal.

In some embodiments, both the first wireless transceiver and the second wireless transceiver cover an operational frequency band, and the operational frequency band is higher than or equal to 60 GHz.

In some embodiments, the first wireless transceiver includes one or more antenna elements.

In some embodiments, the first wireless transceiver provides a plurality of radiation beam directions.

In some embodiments, the communication device further includes an eyeball-tracking module disposed on the frame element. The eyeball-tracking module generates a control signal according to an eyeball detection signal.

In some embodiments, the first wireless transceiver selects one of the radiation beam directions according to the control signal.

In another preferred embodiment, the invention proposes a communication method that includes the steps of: providing a frame element, a first wireless transceiver, a reflector, and a contact lens element, wherein the first wireless transceiver and the reflector are disposed on the frame element, and the contact lens element includes a second wireless transceiver; transmitting a wireless signal via the first wireless transceiver; reflecting the wireless signal via the reflector; and receiving the wireless signal from the reflector via the second wireless transceiver.

In some embodiments, the communication method further includes: receiving an external signal via the first wireless transceiver.

In some embodiments, the communication method further includes: generating the wireless signal according to the external signal via the first wireless transceiver.

In some embodiments, the communication method further includes: providing an eyeball-tracking module, wherein the eyeball-tracking module is disposed on the frame element.

In some embodiments, the communication method further includes: generating a control signal according to an eyeball detection signal via the eyeball-tracking module.

In some embodiments, the communication method further includes: selecting one of the radiation beam directions according to the control signal via the first wireless transceiver.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
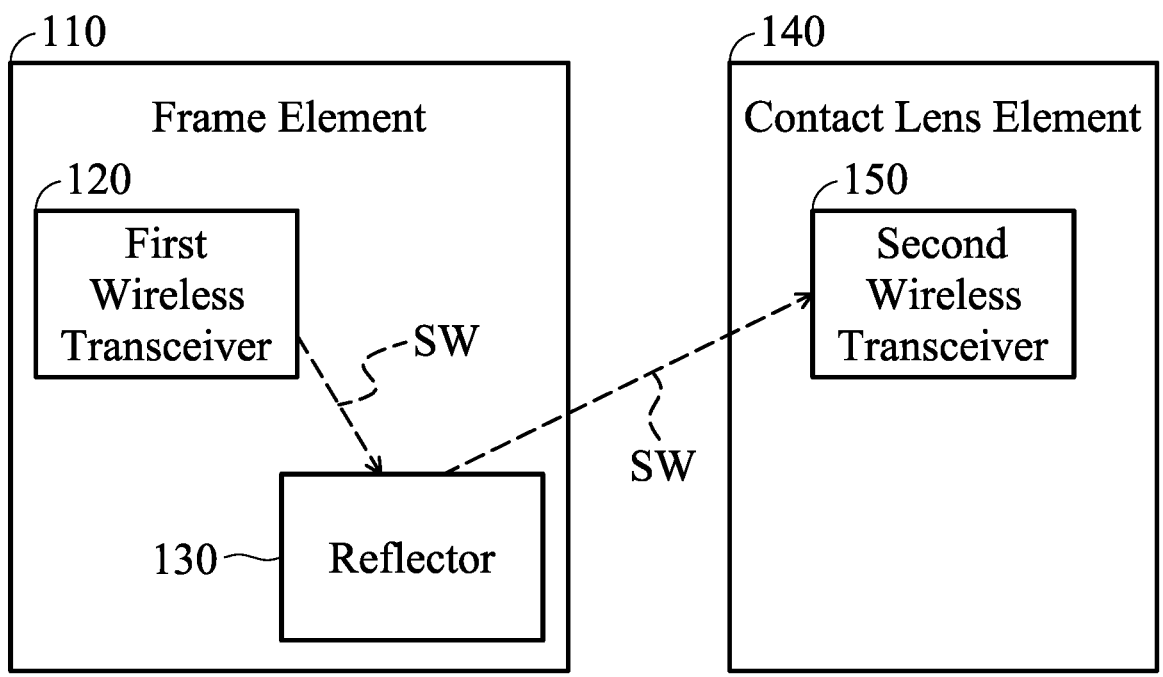
FIG. 1 is a diagram of a communication device according to an embodiment of the invention.

In order to illustrate the foregoing and other purposes, features and advantages of the invention, the embodiments and figures of the invention will be described in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the subject matter provided. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a diagram of a communication device 100 according to an embodiment of the invention. The communication device 100 may be applied to an HMD (Head Mounted Display) or a mobile device, such as an AR glasses, a smart phone, a tablet computer, or a notebook computer, but it is not limited thereto. In the embodiment of FIG. 1, the communication device 100 includes a frame element 110, a first wireless transceiver 120, a reflector 130, and a contact lens element 140. It should be understood that the communication device 100 may further include other components, such as a housing, a speaker, and/or a power supply module, although they are not displayed in FIG. 1.

The shape and type of the frame element 110 are not limited in the invention. In some embodiments, the frame element 110 is an XR (Extended Reality) glasses frame. For example, the aforementioned XR may include VR (Virtual Reality), MR (Mixed Reality), and/or AR (Augmented Reality).

The first wireless transceiver 120 is disposed on the frame element 110. The first wireless transceiver 120 is configured to transmit a wireless signal SW. The reflector 130 is also disposed on the frame element 110. The reflector 130 is configured to reflect the wireless signal SW. The contact lens element 140 includes a second wireless transceiver 150. The second wireless transceiver 150 is configured to receive the wireless signal SW from the reflector 130.

In some embodiments, both the first wireless transceiver 120 and the second wireless transceiver 150 can cover an operational frequency band, and the operational frequency band may be higher than or equal to 60 GHz. Accordingly, the first wireless transceiver 120 and the second wireless transceiver 150 can support at least the wideband operations of mmWave (Millimeter Wave) or THz (Terahertz).

With the design of the invention, the proposed reflector 130 can help to enhance the radiation gain of the first wireless transceiver 120. Generally, after the reflector 130 is used, the radiation beams of the first wireless transceiver 120 can be further concentrated in the same direction, thereby improving the communication quality between the first wireless transceiver 120 and the second wireless transceiver 150.

The following embodiments will introduce different configurations and detail structural features of the communication device 100. It should be understood that these figures and descriptions are merely exemplary, rather than limitations of the invention.

Figure 2:
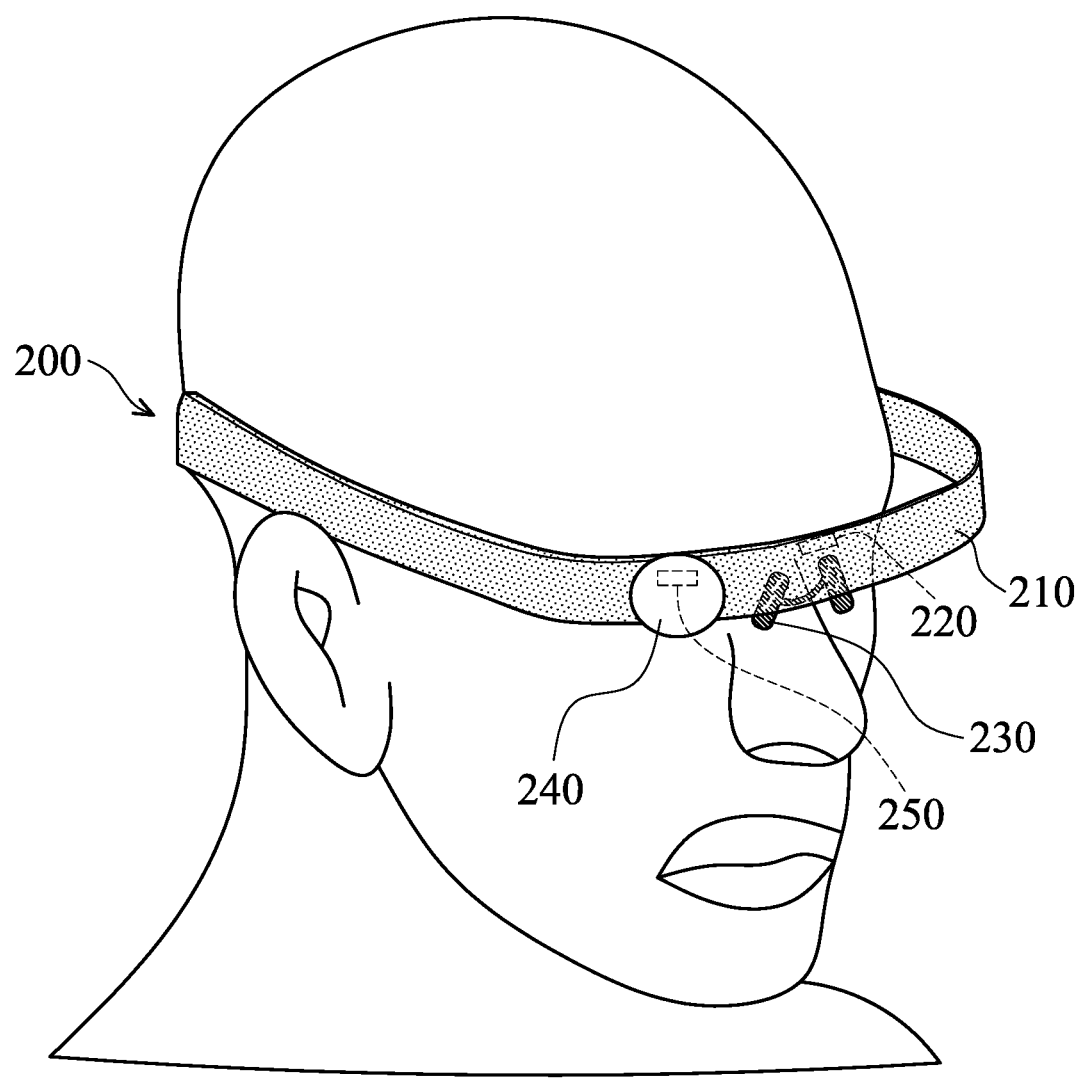
FIG. 2 is a perspective view of a communication device according to an embodiment of the invention.

FIG. 2 is a perspective view of a communication device 200 according to an embodiment of the invention. FIG. 2 is similar to FIG. 1. In the embodiment of FIG. 2, the communication device 200 includes a frame element 210, a first wireless transceiver 220, a reflector 230, and a contact lens element 240. The contact lens element 240 includes a second wireless transceiver 250. It should be noted that the frame element 210 is an XR glasses frame, and the reflector 230 is implemented with a nose pad arm of the XR glasses frame, so as to minimize the size of the entire communication device 200. Other features of the communication device 200 of FIG. 2 are similar to those of the communication device 100. Therefore, the two embodiments can achieve similar levels of performance.

Figure 3:
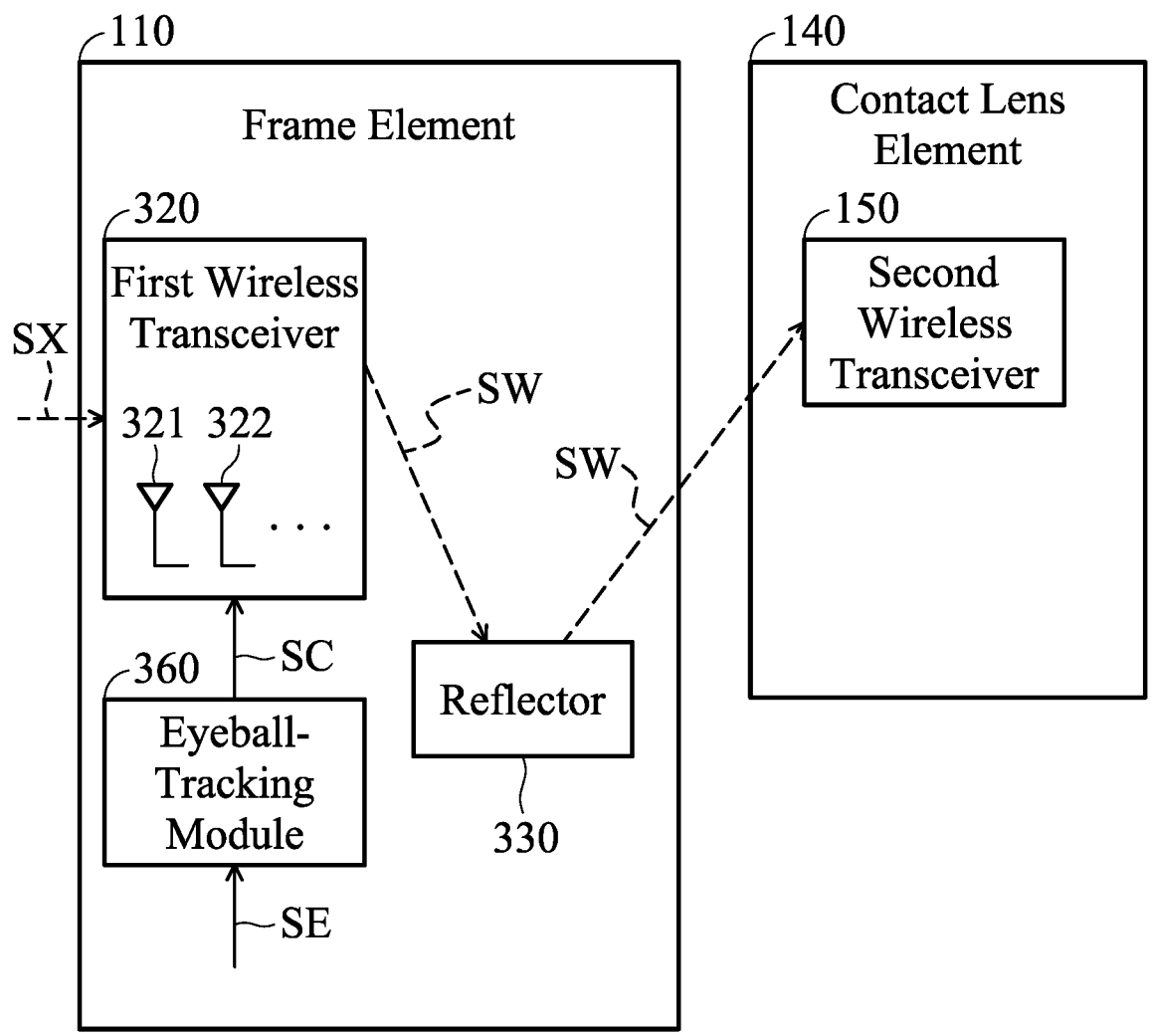
FIG. 3 is a diagram of a communication device according to an embodiment of the invention.

FIG. 3 is a diagram of a communication device 300 according to an embodiment of the invention. FIG. 3 is similar to FIG. 1. In the embodiment of FIG. 3, a first wireless transceiver 320 of the communication device 300 includes one or more antenna elements 321 and 322, and the communication device 300 further includes an eyeball-tracking module 360. The eyeball-tracking module 360 is disposed on the frame element 210.

The first wireless transceiver 320 further receives an external signal SX. For example, the external signal SX may be from a smart phone or a wireless access point, but it is not limited thereto. In some embodiments, the first wireless transceiver 320 generates the wireless signal SW according to the external signal SX. In alternative embodiments, the first wireless transceiver 320 directly relays the external signal SX. That is, the wireless signal SW transmitted to the reflector 130 can be the same as the aforementioned external signal SX.

The shapes and types of the antenna elements 321 and 322 are not limited in the invention. For example, any of the antenna elements 321 and 322 may be a monopole antenna, a loop antenna, a helical antenna, a patch antenna, a PIFA (Planar Inverted F Antenna), or a chip antenna. In alternative embodiments, the first wireless transceiver 320 merely includes the single antenna element 321, but does not include the other antenna element 322.

Figure 4:
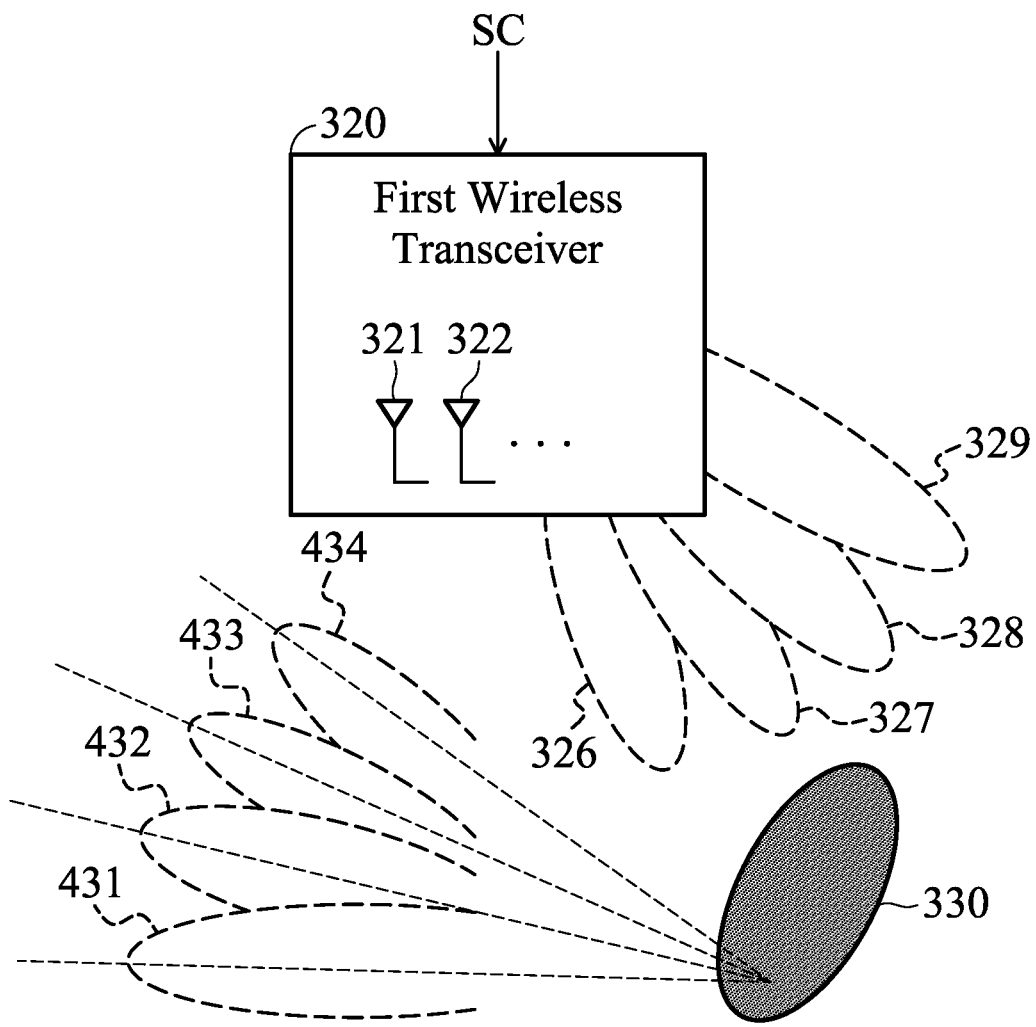
FIG. 4 is a diagram of a tunable reflective mechanism of a communication device according to an embodiment of the invention.

FIG. 4 is a diagram of a tunable reflective mechanism of the communication device 300 according to an embodiment of the invention. Please refer to FIG. 3 and FIG. 4 together. In the embodiment of FIG. 4, the first wireless transceiver 320 provides a plurality of radiation beam directions 326, 327, 328 and 329. In addition, after an eyeball detection process is performed, the eyeball-tracking module 360 can generate a control signal SC according to an eyeball detection signal SE. For example, the eyeball detection signal SE may be relative to the rotation state of an eyeball. Next, the first wireless transceiver 320 can select one of the radiation beam directions 326, 327, 328 and 329 according to the control signal SC. That is, the first wireless transceiver 320 can transmit the wireless signal SW along the selected radiation beam direction. In response to the selected radiation beam direction, a reflector 330 of the communication device 300 can correspond to one of a plurality of reflective directions 431, 432, 433 and 434. That is, the reflector 330 can reflect the wireless signal SW along the corresponding reflective direction. With such a design, the communication device 300 can have the function of beamforming or beam switching, so as to achieve the desired tunable reflective mechanism. Other features of the communication device 300 of FIG. 3 are similar to those of the communication device 100. Therefore, the two embodiments can achieve similar levels of performance.

Figure 5:
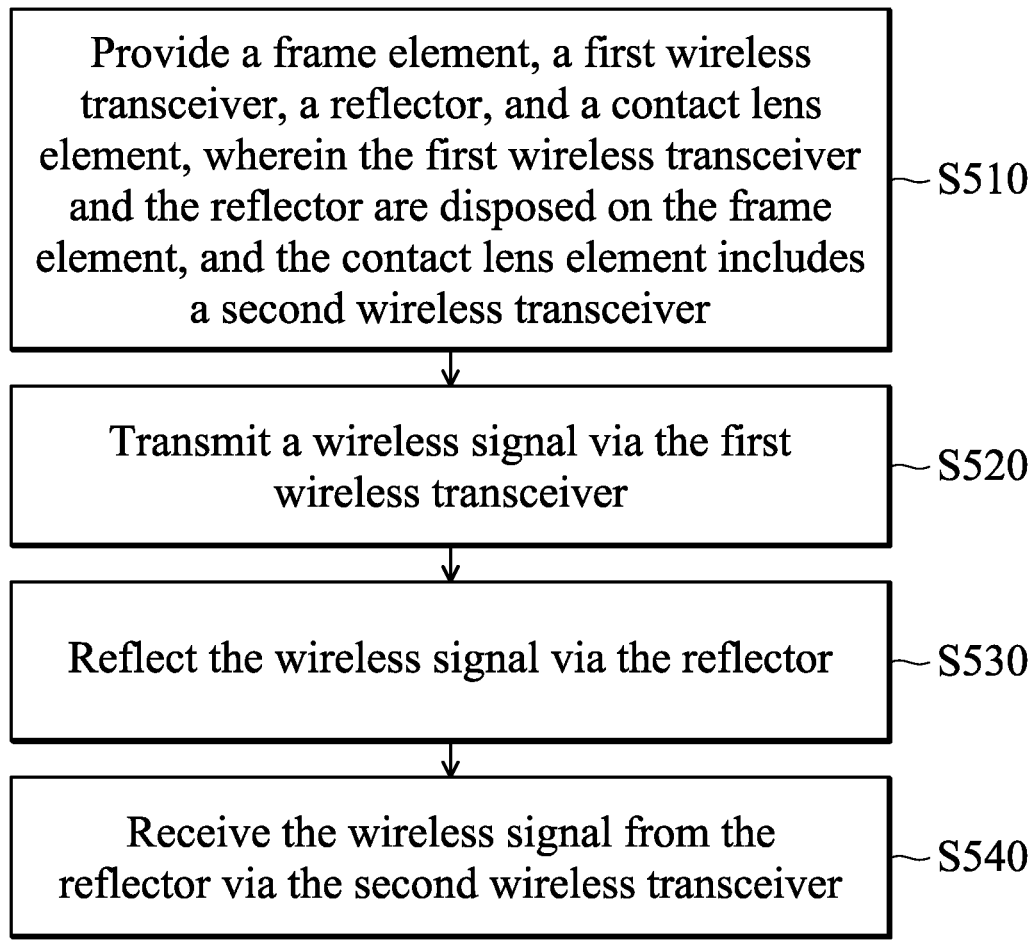
FIG. 5 is a flowchart of a communication method according to an embodiment of the invention.

FIG. 5 is a flowchart of a communication method according to an embodiment of the invention. To begin, in step S510, a frame element, a first wireless transceiver, a reflector, and a contact lens element are provided. The first wireless transceiver and the reflector are disposed on the frame element. The contact lens element includes a second wireless transceiver. In step S520, a wireless signal is transmitted via the first wireless transceiver. In step S530, the wireless signal is reflected via the reflector. Finally, in step S540, the wireless signal is received from the reflector via the second wireless transceiver. It should be understood that these steps are not required to be performed in order, and every feature of the embodiments of FIGS. 1 to 4 may be applied to the communication method of FIG. 5.

The invention proposed a novel communication device and a novel communication method. In comparison to the conventional design, the invention has at least the advantages of increasing the radiation gain, minimizing the overall device size, and reducing the total manufacturing cost. Therefore, the invention is suitable for application in a variety of devices.

Note that the above element parameters are not limitations of the invention. A designer can fine-tune these setting values according to different requirements. It should be understood that the communication device and communication method of the invention are not limited to the configurations of FIGS. 1-5. The invention may include any one or more features of any one or more embodiments of FIGS. 1-5. In other words, not all of the features displayed in the figures should be implemented in the communication device and communication method of the invention.

The method of the invention, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with a true scope of the disclosed embodiments being indicated by the following claims and their equivalents.

What is claimed is:

1. A communication device, comprising:
   a frame element;
   a first wireless transceiver, disposed on the frame element, wherein the first wireless transceiver is configured to transmit a wireless signal;
   a reflector, disposed on the frame element, wherein the reflector is configured to reflect the wireless signal; and
   a contact lens element, comprising a second wireless transceiver, wherein the second wireless transceiver is configured to receive the wireless signal from the reflector.

2. The communication device as claimed in claim 1, wherein the frame element is an XR (Extended Reality) glasses frame.

3. The communication device as claimed in claim 2, wherein the reflector is implemented with a nose pad arm of the XR glasses frame.

4. The communication device as claimed in claim 1, wherein the first wireless transceiver further receives an external signal.

5. The communication device as claimed in claim 4, wherein the first wireless transceiver further generates the wireless signal according to the external signal.

6. The communication device as claimed in claim 1, wherein both the first wireless transceiver and the second wireless transceiver cover an operational frequency band, and the operational frequency band is higher than or equal to 60 GHz.

7. The communication device as claimed in claim 1, wherein the first wireless transceiver comprises one or more antenna elements.

8. The communication device as claimed in claim 1, wherein the first wireless transceiver provides a plurality of radiation beam directions.

9. The communication device as claimed in claim 8, further comprising:
   an eyeball-tracking module, disposed on the frame element, wherein the eyeball-tracking module generates a control signal according to an eyeball detection signal.

10. The communication device as claimed in claim 9, wherein the first wireless transceiver selects one of the radiation beam directions according to the control signal.

11. A communication method, comprising the steps of:
   providing a frame element, a first wireless transceiver, a reflector, and a contact lens element, wherein the first wireless transceiver and the reflector are disposed on the frame element, and the contact lens element comprises a second wireless transceiver;
   transmitting a wireless signal via the first wireless transceiver;
   reflecting the wireless signal via the reflector; and
   receiving the wireless signal from the reflector via the second wireless transceiver.

12. The communication method as claimed in claim 11, wherein the frame element is an XR glasses frame.

13. The communication method as claimed in claim 12, wherein the reflector is implemented with a nose pad arm of the XR glasses frame.

14. The communication method as claimed in claim 11, further comprising:
   receiving an external signal via the first wireless transceiver.

15. The communication method as claimed in claim 14, further comprising:
   generating the wireless signal according to the external signal via the first wireless transceiver.

16. The communication method as claimed in claim 11, wherein both the first wireless transceiver and the second wireless transceiver cover an operational frequency band, and the operational frequency band is higher than or equal to 60 GHz.

17. The communication method as claimed in claim 11, wherein the first wireless transceiver provides a plurality of radiation beam directions.

18. The communication method as claimed in claim 17, further comprising:
   providing an eyeball-tracking module, wherein the eyeball-tracking module is disposed on the frame element.

19. The communication method as claimed in claim 18, further comprising:
   generating a control signal according to an eyeball detection signal via the eyeball-tracking module.

20. The communication method as claimed in claim 19, further comprising:
   selecting one of the radiation beam directions according to the control signal via the first wireless transceiver.

* * * * *